(12) United States Patent
Kamata et al.

(10) Patent No.: US 8,179,856 B2
(45) Date of Patent: May 15, 2012

(54) SYSTEM AND METHOD FOR MANAGING TRANSMISSIONS BETWEEN COMMUNICATION DEVICES USING COMPRESSION TECHNIQUES

(75) Inventors: Masashi Kamata, Tokyo (JP); Tadakazu Nagai, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 130 days.

(21) Appl. No.: 12/565,073

(22) Filed: Sep. 23, 2009

(65) Prior Publication Data

US 2010/0085987 A1   Apr. 8, 2010

(30) Foreign Application Priority Data

Oct. 8, 2008   (JP) .................................. 2008-262205

(51) Int. Cl.
*H04B 7/212*   (2006.01)
*H04B 7/00*   (2006.01)

(52) U.S. Cl. .......................... 370/330; 455/516; 455/526

(58) Field of Classification Search .................. 370/322, 370/329, 330, 332, 343, 346; 455/41.2, 46, 455/513, 516, 526, 556.1; 704/500; 710/30
See application file for complete search history.

(56) References Cited

U.S. PATENT DOCUMENTS

| | | | |
|---|---|---|---|
| 7,406,296 B2 | 7/2008 | Haartsen | |
| 7,899,396 B2 * | 3/2011 | Meylan et al. | 455/41.2 |
| 2005/0059347 A1 | 3/2005 | Haartsen | |
| 2006/0194538 A1 * | 8/2006 | Palin et al. | 455/41.2 |
| 2008/0043705 A1 * | 2/2008 | Desai et al. | 370/346 |
| 2008/0259837 A1 | 10/2008 | Thoukydides | |
| 2008/0287063 A1 * | 11/2008 | Kidron et al. | 455/41.2 |
| 2009/0099851 A1 * | 4/2009 | Pilati et al. | 704/500 |
| 2009/0234983 A1 * | 9/2009 | Golden et al. | 710/30 |
| 2010/0056051 A1 * | 3/2010 | Hirsch et al. | 455/41.2 |
| 2010/0080205 A1 * | 4/2010 | Hirsch et al. | 370/338 |

FOREIGN PATENT DOCUMENTS

| | | |
|---|---|---|
| JP | 2006-352522 | 12/2006 |
| JP | 2007-503733 | 2/2007 |
| JP | 2007-143155 | 6/2007 |
| JP | 2007-329707 | 12/2007 |
| JP | 2008-99261 | 4/2008 |
| JP | 2009-512245 | 3/2009 |
| WO | 2007/036687 | 4/2007 |

OTHER PUBLICATIONS

Notice of Rejection dated Sep. 28, 2010, from the corresponding Japanese Application.

* cited by examiner

*Primary Examiner* — Kwang B Yao
*Assistant Examiner* — Awet Haile
(74) *Attorney, Agent, or Firm* — Katten Muchin Rosenman LLP

(57) ABSTRACT

There is provided a communication device including a first communication unit and a second communication unit that use a band causing a conflict between them, the communication device changing a compressibility of communication data to be transmitted by the second communication unit based on a communication status of the first communication unit.

5 Claims, 6 Drawing Sheets

FIG.6

| NUMBER OF CONNECTED CONTROLLERS | WLAN COMMUNICATION | NUMBER OF SLOTS FOR WLAN COMMUNICATION | NUMBER OF SLOTS FOR A2DP COMMUNICATION |
|---|---|---|---|
| 0 | UNEXECUTED | 0 | 18 |
| 1 | UNEXECUTED | 0 | 16 |
| 2 | UNEXECUTED | 0 | 14 |
| 3 | UNEXECUTED | 0 | 12 |
| 4 | UNEXECUTED | 0 | 10 |
| 0 | EXECUTED | 10 | 8 |
| 1 | EXECUTED | 8 | 8 |
| 2 | EXECUTED | 6 | 8 |
| 3 | EXECUTED | 6 | 6 |
| 4 | EXECUTED | 4 | 6 |

SYSTEM AND METHOD FOR MANAGING TRANSMISSIONS BETWEEN COMMUNICATION DEVICES USING COMPRESSION TECHNIQUES

BACKGROUND OF THE INVENTION

1. Field of the Invention

The present invention relates to a communication device capable of executing communications by a plurality of communication means, a control method therefor, and an information storage medium.

2. Description of the Related Art

Various kinds of schemes, including a Bluetooth (registered trademark) standard and a wireless LAN (WLAN) based on IEEE 802.11, have been proposed as communication schemes (standards). In order to ensure compatibility with such a plurality of communication schemes as described above, a communication device may be provided with a plurality of communication means that can operate independently of each other. However, the communication schemes include a pair of communication schemes that use a band causing conflict between them when respectively performing communications. For example, Bluetooth communications and WLAN communications are both wireless communications that use a frequency band of 2.4 GHz, which may raise a problem of their mutual interference. Therefore, there is proposed technology for avoiding occurrence of a conflict between the plurality of communication means as described above (see, for example, JP 2007-143155 A). According to this technology, in order to execute communications performed by one communication means without failure, communications performed by another communication means are suppressed at a time when the communications performed by the communication means are executed.

SUMMARY OF THE INVENTION

A communication protocol for retransmitting communication data based on a communication status is used for a purpose such as to realize high-quality audio communications. With such a communication protocol, an amount of data to be transmitted/received per unit time varies depending upon the communication status, which makes it difficult to predict an actual amount of data to be transmitted/received in advance. Therefore, if the communication device that performs communications according to such a communication protocol employs the related-art technology described above, there may arise a problem that, particularly in a case where quality of communications performed by one communication means is unsatisfactory or other such cases, communications performed by the other communication means may be excessively suppressed depending upon the communication status, leading to disconnection of a communication connection.

The present invention has been made in view of the above-mentioned circumstances, and therefore an object thereof is to provide a communication device capable of performing adjustment under desirable conditions between a plurality of communication means that use a band causing a conflict between them, when respectively performing communications, a control method therefor, and an information storage medium.

In order to solve the above-mentioned problem, a communication device of the present invention includes: a first communication section and a second communication section that use a band causing a conflict between them; and a compressibility adjusting section for changing a compressibility of communication data to be transmitted by the second communication section based on a communication status of the first communication section.

In the above-mentioned communication device, the compressibility adjusting section may change the compressibility according to whether or not communications are being executed by the first communication section.

Further, in the above-mentioned communication device, the compressibility adjusting section may change the compressibility according to the communication status of the first communication section and a communication status of the second communication section.

In addition, in the above-mentioned communication device, the compressibility adjusting section may change the compressibility according to a retransmission ratio of the communication data to be transmitted by the second communication section.

Further, in the above-mentioned communication device, the compressibility adjusting section may change a compressibility of audio data to be transmitted by the second communication section.

Further, according to the present invention, a control method for a communication device, including a first communication section and a second communication section that use a band causing a conflict between them, includes: changing a compressibility of communication data to be transmitted by the second communication section based on a communication status of the first communication section.

Further, a computer-readable information storage medium of the present invention stores thereon a program for causing a communication device, including a first communication section and a second communication section that use a band causing a conflict between them, to function as a compressibility adjusting section for changing a compressibility of communication data to be transmitted by the second communication section based on a communication status of the first communication section.

BRIEF DESCRIPTION OF THE DRAWINGS

In the accompanying drawings:

FIG. 6 is a diagram illustrating an example of a table used for deciding a band to be allocated to A2DP communications.

DETAILED DESCRIPTION OF THE INVENTION

Hereinafter, detailed description is given of an embodiment of the present invention with reference to the accompanying drawings.

Figure 1:
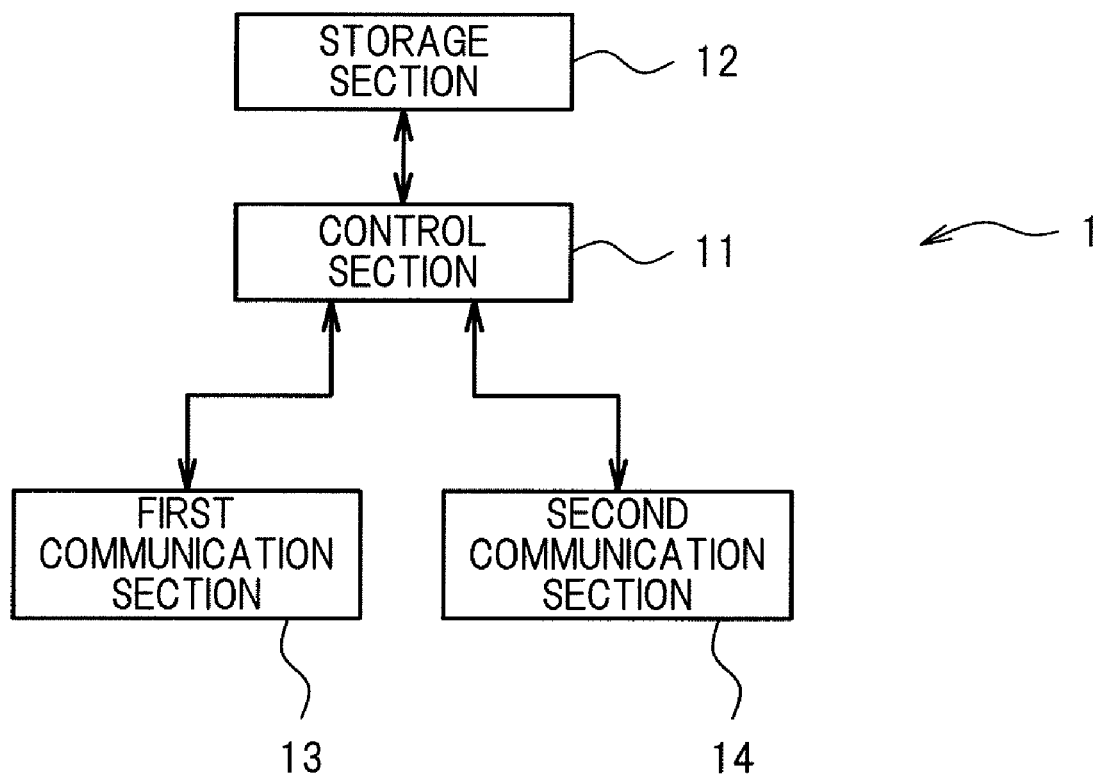
FIG. 1 is a block diagram illustrating a configuration of a communication device according to an embodiment of the present invention.

FIG. 1 is a block diagram illustrating a configuration of a communication device 1 according to one embodiment of the present invention. As illustrated in FIG. 1, the communication device 1 is a home-use game machine or the like, and includes a control section 11, a storage section 12, a first communication section 13, and a second communication section 14.

The control section 11 is a microprocessor or the like, and executes various information processing according to a program stored in the storage section 12. Specific examples of the processing executed by the control section 11 in this embodiment are described later.

The storage section 12 includes a memory device such as a RAM or a ROM or a hard disk drive, and stores therein a program executed by the control section 11, and various kinds of data. In addition, the storage section 12 operates as a work memory for the control section 11.

The first communication section 13 is a communication module for performing wireless LAN communications (WLAN communications) based on IEEE 802.11. The communication device 1 performs data communications wirelessly via the first communication section 13 with another communication device such as a personal computer, a wireless LAN access point, or a portable game machine.

The second communication section 14 is a communication module for performing communications (Bluetooth communications) based on a Bluetooth standard. The communication device 1 performs data communications wirelessly via the second communication section 14 with each of various Bluetooth devices such as a controller for the home-use game machine and a headset.

Particularly in this embodiment, the second communication section 14 performs communications with audio recording/reproducing device such as the headset, based on an advanced audio distribution profile (A2DP). This profile is a kind of profile used for audio transmission/reception according to the Bluetooth standard, and specifies that data retransmission is performed based on a communication status at the time of occurrence of a communication error or other such occasion, in order to realize transmission/reception of high-quality audio data. In the case of streaming data communications, the data retransmission needs to be executed within a fixed period of time (to be specific, a period of time corresponding to an amount of buffered data on a data receiving side). Note that the data retransmission is controlled by a control chip included in the second communication section 14 independently of the control section 11. In the following description, as a specific example, the second communication section 14 executes communications with a headset HS based on the A2DP.

In this embodiment, the first communication section 13 and the second communication section 14 execute communications using a frequency band (2.4 GHz band) that causes interference between them. Therefore, if the first communication section 13 and the second communication section 14 execute communications simultaneously, a collision or the like may occur between them. Accordingly, the communication device 1 performs control to suppress the communications performed by the first communication section 13 while the second communication section 14 is executing communications.

Specific examples of such control include a method of notifying the first communication section 13 that the second communication section 14 is executing the Bluetooth communications. According to this method, the first communication section 13 suppresses its own WLAN communications while a signal notifying that the second communication section 14 is executing communications is being received from the second communication section 14.

Figure 2:
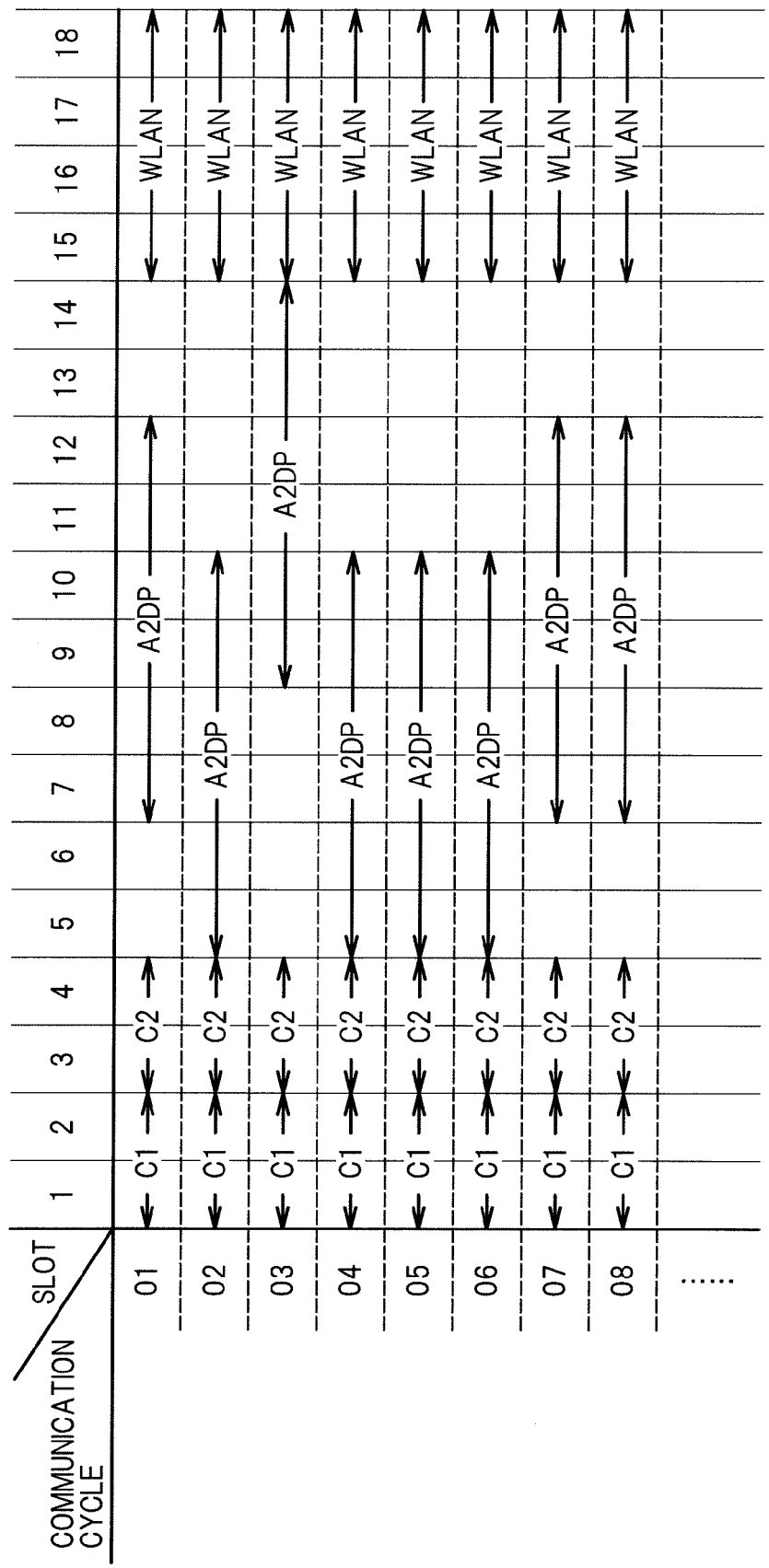
FIG. 2 is a diagram illustrating an example of how a communication band is allocated in the communication device according to the embodiment of the present invention.

In addition, there is a method of dividing a communication cycle into fixed intervals in a case where the second communication section 14 needs to periodically perform communications with the Bluetooth device, and allocating a part thereof to the Bluetooth communications and another part to the WLAN communications. FIG. 2 is a diagram illustrating an example of how a communication band is allocated according to such a method. In a table exemplified in FIG. 2, rows represent communication cycles, and columns represent a plurality of slots included in one communication cycle. Each of the communication cycles is divided into 18 slots. Here, the term "slot" represents a minimum unit used in a band allocation. For example, if one communication cycle is 11.25 ms, one slot is obtained as "11.25 ms/18=625 µs". Note that in the following description, an n-th slot within each communication cycle is represented as Slot n.

In the example of FIG. 2, the communication device 1 is set to perform Bluetooth communications with controllers C1 and C2 and the headset HS. As illustrated in FIG. 2, Slots 1 and 2 of each communication cycle are allocated to the controller C1, and Slots 3 and 4 are allocated to the controller C2. Each of the controllers C1 and C2 is a communication device demanded to perform communications with the communication device 1 at least once in a communication cycle, and hence a fixed slot within each communication cycle is allocated to the communication device for its communications. Meanwhile, Slots 15 to 18 are allocated to the WLAN communications. That is, the first communication section 13 performs WLAN communications within Slots 15 to 18. In order to realize such control, a signal for notifying of a start time of each communication cycle is output from the second communication section 14 to the first communication section 13. Further, within Slots 5 to 14 of FIG. 2, the second communication section 14 executes communications based on the A2DP. Timing for such A2DP communications is determined by the control chip included in the second communication section 14. In the A2DP communications, a packet that occupies a predetermined number of continuous slots is transmitted/received. To be specific, in the A2DP communications of the example of FIG. 2, one packet occupies three slots for audio transmission and three slots for audio reception, that is, six slots in total.

Figure 3:
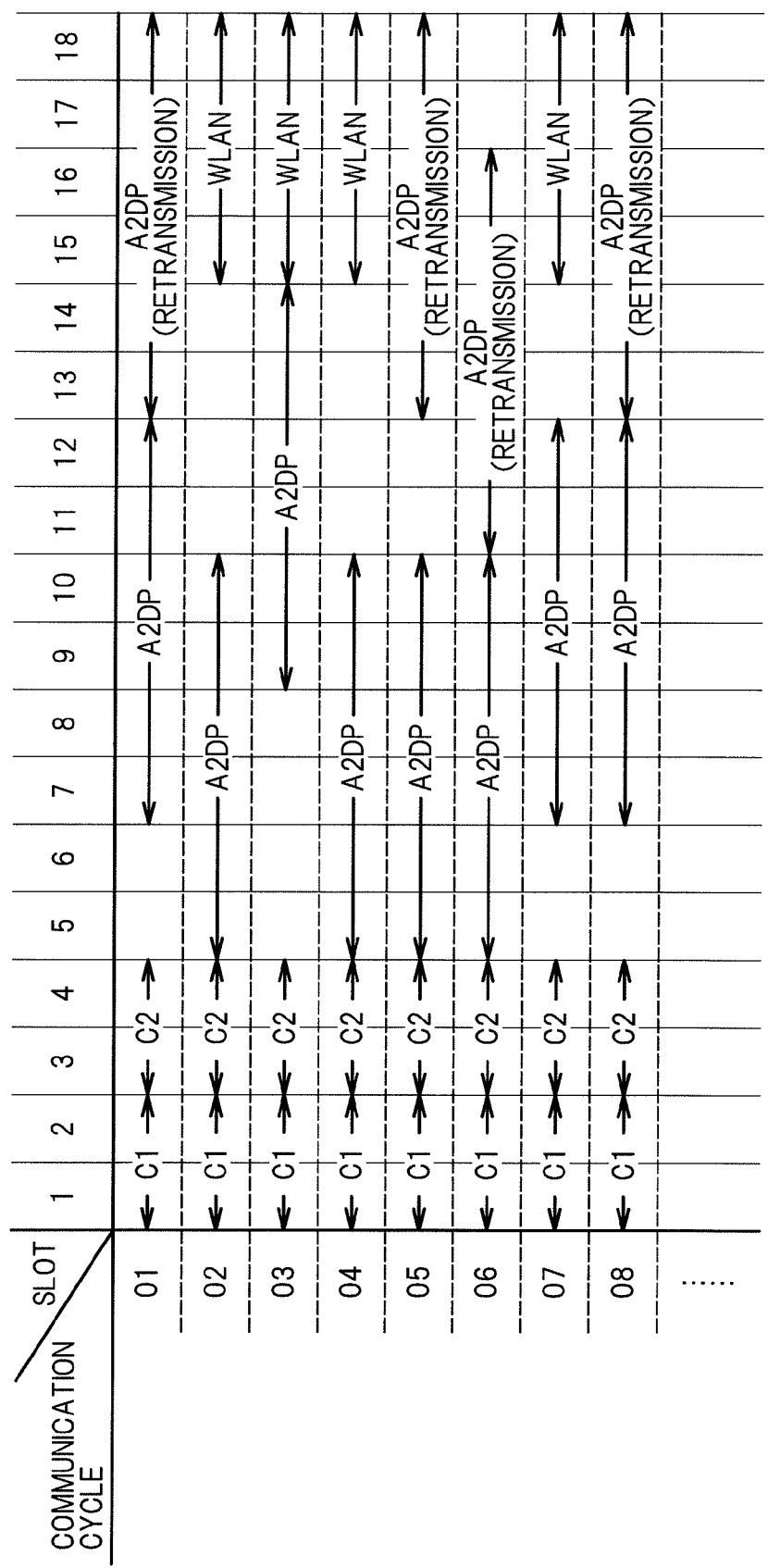
FIG. 3 is a diagram illustrating an example of how the communication band is allocated in a case where audio data is retransmitted.

FIG. 2 illustrates an example of a case where packet retransmission is not performed in the A2DP communications. Therefore, a conflict does not occur between the Bluetooth communications and the WLAN communications. However, in actuality, as described above, the second communication section 14 retransmits a packet for the A2DP communications based on the communication status. FIG. 3 is a diagram illustrating an example of a communication status of the second communication section 14 in a case where such A2DP packet retransmission is performed. In FIG. 3 as well as in FIG. 2, rows represent communication cycles, and columns represent a plurality of slots included in one communication cycle. In the example of FIG. 3, the A2DP packet retransmission occurs in first, fifth, sixth, and eighth communication cycles, and the second communication section 14 performs communications during periods of Slots 15 to 18 in the same communication cycles. Therefore, in a case where the first communication section 13 performs WLAN communications during the periods of Slots 15 to 18 in the same manner as in FIG. 2, a conflict occurs between them. In addition, as described above, in a case where the first communication section 13 executes WLAN communications only during a period with no signal notifying that the second communication section 14 is executing communications being received from the second communication section 14, the WLAN communications may be restricted for a long period depending upon the communication status, which may raise a problem that the WLAN communications are delayed or a communication connection is disconnected. Accordingly, in this embodiment, as described later, the control section 11 performs control for suppressing the A2DP packet retransmission as required.

Figure 4:
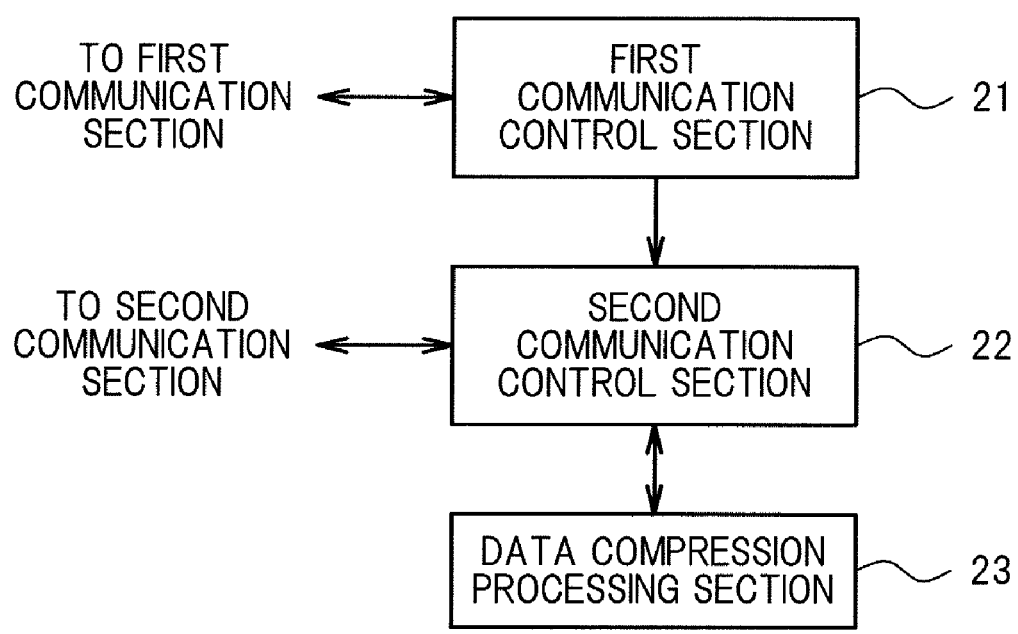
FIG. 4 is a functional block diagram illustrating a functional example of the communication device according to the embodiment of the present invention.

As illustrated in FIG. 4, the communication device 1 according to this embodiment functionally includes a first communication control section 21, a second communication control section 22, and a data compression processing section 23. Those functions can be implemented by the control section 11 executing programs stored in the storage section 12. The programs may be provided via a communication network such as the Internet, or may be provided by being stored on various computer-readable information storage media such as an optical disk.

The first communication control section 21 is implemented by the control section 11 executing a program such as a TCP/IP network driver program, and controls the WLAN communications via the first communication section 13. In addition, the first communication control section 21 records information regarding the communication status of the first communication section 13, and provides the information to the second communication control section 22. To be specific, in this embodiment, as the information regarding the communication status of the first communication section 13, the first communication control section 21 counts the number of packets for the WLAN communications that are transmitted and received by the first communication section 13 every predetermined period of time, and outputs a numerical value thereof to the second communication control section 22.

The second communication control section 22 is implemented by the control section 11 executing a program such as a Bluetooth driver program, and controls the Bluetooth communications via the second communication section 14. Particularly in this embodiment, the second communication control section 22 acquires the information regarding the communication status of the first communication section 13 and information regarding the communication status of the second communication section 14, and based on those items of information, the second communication section 14 performs processing (compressibility adjusting processing) to change compressibility of communication data when the A2DP communications with the headset HS are executed. As the second communication control section 22 raises the compressibility of the communication data based on the communication status, the amount of data to be transmitted/received is reduced accordingly. As the amount of data is reduced, the probability of occurrence of a communication error is decreased, and it is expected that a data retransmission ratio of the second communication section 14 can also be decreased. In addition, the reduction in amount of data to be transmitted/received allows the second communication section 14 to perform transmission/reception of data using a high-redundancy packet type (modulation scheme). This can also decrease the probability of occurrence of a communication error, and decrease the data retransmission ratio. A specific example of the compressibility adjusting processing executed by the second communication control section 22 will be described later.

The data compression processing section 23 performs compression of data transmitted by the second communication section 14 according to the compressibility adjusted by the second communication control section 22. To be specific, the data compression processing section 23 uses, for example, a subband codec (SBC) to perform compression of audio data to be transmitted to the headset HS by the second communication section 14. The data compression processing section 23 determines the compressibility of the audio data by referencing a bit pool value stored in a predetermined storage area. The second communication control section 22 updates the bit pool value at regular time intervals to thereby change the compressibility used when the data compression processing section 23 performs data compression.

Figure 5:
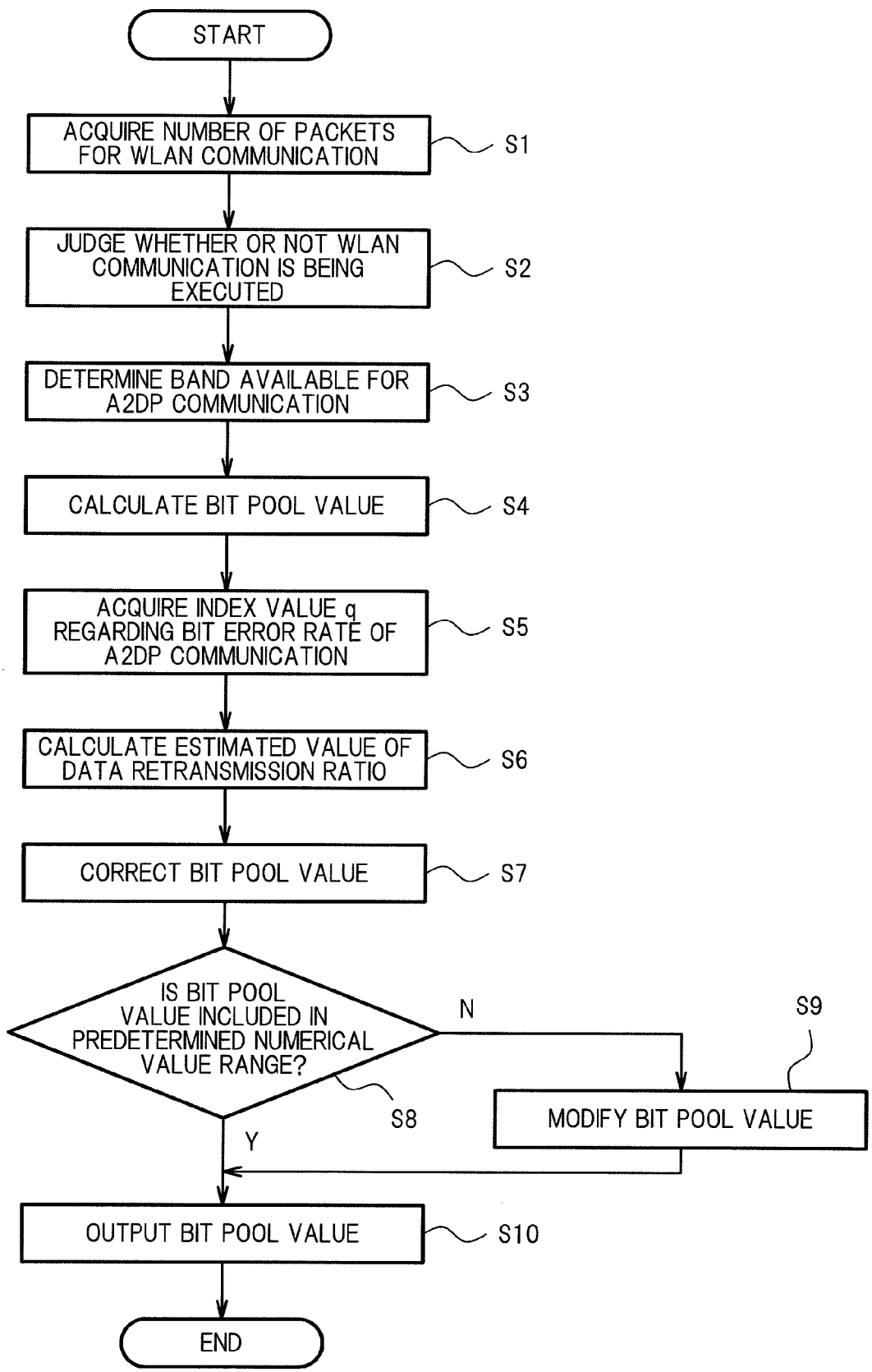
FIG. 5 is a flowchart illustrating an example of a flow of compressibility adjusting processing.

Hereinafter, a specific example of a flow of the compressibility adjusting processing executed by the second communication control section 22 will be described based on the flowchart of FIG. 5. The processing illustrated in FIG. 5 is repeatedly executed every predetermined period of time T (for example, one second) while the A2DP communications are being executed by the second communication section 14.

First, the second communication control section 22 acquires the information regarding the communication status of the first communication section 13. To be specific, the second communication control section 22 references data on the number of packets for the WLAN communications which is recorded by the first communication control section 21, and acquires a value of the number of packets that are transmitted/received for the WLAN communications during the time T in the immediate past (that is, a period from the previous execution of the compressibility adjusting processing to the current execution of the compressibility adjusting processing) (S1). Then, the second communication control section 22 judges, based on whether or not the acquired value of the number of packets is equal to or larger than a predetermined threshold, whether or not the WLAN communications are being executed at the time of execution of this processing (S2). That is, if the number of packets is equal to or larger than the predetermined threshold, it is judged that the WLAN communications are being executed, and if the number of packets is below the predetermined threshold, it is judged that the WLAN communications are not being executed.

Subsequently, the second communication control section 22 uses a judgment result of Step S2 to determine a band available for the A2DP communications (S3). At this time, the second communication control section 22 may determine the available band using not only the judgment result of Step S2 (that is, communication status of the first communication section 13) but also information on the number and types of communication devices other than the headset HS that have established a communication connection with the second communication section 14.

As an example, the second communication control section 22 references a table exemplified in FIG. 6 to determine a band (number of slots) to be used for the A2DP communications per communication cycle (=18 slots) of the second communication section 14. It is assumed here that the second communication section 14 can be connected to a maximum of four controllers, each of which performs the Bluetooth communications by using two slots per communication cycle, other than the headset HS. In this case, the number of slots used for the A2DP communications per communication cycle is determined based on the number of connected controllers and the judgment result of Step S2. In the example of FIG. 6, if it is judged that the WLAN communications are not being executed, all slots other than the slots to be used for the communications performed by the controllers are allocated to use by the A2DP communications. In contrast, if it is judged that the WLAN communications are being executed, ten to four slots are secured for the WLAN communications based on the number of connected controllers, and eight to six slots remaining after excluding the slots used for the WLAN communications and the Bluetooth communications performed by the controllers are allocated to use by the A2DP communications.

Further, the second communication control section 22 determines a packet type for the A2DP communications and the number of packets that can be transmitted per communication cycle based on the band (number of maximum slots available for the A2DP communications per communication cycle) determined in Step S3, and calculates an amount of audio data that can be transmitted per communication cycle based on the packet type and the number of packets. The second communication control section 22 uses the calculated amount of data to calculate the bit pool value indicating to what extent the audio data is to be compressed (S4). The bit pool value calculated here corresponds to a compressibility of the audio data such that an amount of audio data to be transmitted per unit time, if the second communication section 14 does not perform the data retransmission for the A2DP communications, can be transmitted within the band determined in Step S3. Note that here, the packet type for the A2DP communications determined by the second communication control section 22 may be predefined corresponding to the bands available for the A2DP communications, or may be selected according to the type of Bluetooth device to be subjected to the communications.

After that, the second communication control section 22 acquires the information regarding the communication status of the second communication section 14. To be specific, the second communication control section 22 issues an inquiry to the second communication section 14, and acquires an index value q regarding a bit error rate of the A2DP communications (S5). The index value q represents a value corresponding to the data retransmission ratio used for the A2DP communications during the time T in the immediate past.

Further, the second communication control section 22 uses the index value q acquired in Step S5 to calculate an estimated value of the data retransmission ratio (S6). At this time, instead of calculating the estimated value of the data retransmission ratio only from the index value q obtained in the immediate past, the second communication control section 22 may calculate an estimated value of a corrected data retransmission ratio by performing correction thereof according to values of index values q obtained in the past within a predetermined period. In this case, the correction of the data retransmission ratio is performed in order to prevent the calculated estimated value of the data retransmission ratio from changing abruptly compared with the value calculated in the previous compressibility adjusting processing.

As a specific example, the second communication control section 22 uses a variable Sq to perform the calculation of the corrected data retransmission ratio. That is, the second communication control section 22 updates a value of the variable Sq with a value obtained by multiplying a value of the variable Sq by $(N-1)/N$ and adding to it the index value q newly acquired in Step S5. Then, the second communication control section 22 uses a formula prepared in advance to convert the updated value of the variable Sq into a numerical value indicating the data retransmission ratio. In the subsequent compressibility adjusting processing, the above-mentioned processing is performed on the thus-updated value of the variable Sq. According to such processing, the index value q acquired in the immediate past in Step S5 contributes to only 1/N of the value of the variable Sq used for calculating the value of the data retransmission ratio. Therefore, even in a case where the bit error rate instantaneously rises due to occurrence of, for example, abnormal noise or the like, the value of the variable Sq does not significantly change, and the value of the data retransmission ratio calculated in the processing step of Step S6 does not significantly change either from the value calculated in the previous compressibility adjusting processing. This can prevent a significant influence from being exerted on the quality of sound heard by a user when the compressibility of the audio data is abruptly changed. Note that instead of using such a calculation method, for example, a method of calculating a moving average of the index value q during a predetermined period in the past may be used to calculate the estimated value of the corrected data retransmission ratio.

Here, the above-mentioned value of N used for calculating the estimated value of the corrected data retransmission ratio or the period used for calculating the moving average may be defined according to a timeout period for judging that a connection for the WLAN communications is disconnected by the first communication section 13. Accordingly, by correcting the estimated value of the data retransmission ratio in consideration of the index value during a period corresponding to the timeout period for the WLAN communications, it is possible to gradually change the compressibility of data to such an extent that the connection for the WLAN communications is not judged to have been disconnected.

Further, the second communication control section 22 uses the value of the data retransmission ratio calculated in Step S6 to correct the bit pool value calculated in Step S4 (S7). To be specific, for example, if the data retransmission ratio is calculated as 50% (that is, retransmission is performed once every two times) in Step S6, the bit pool value is corrected so as to further compress a communication data amount to $2/3$. Accordingly, even if the data retransmission is executed at the calculated data retransmission ratio, the audio data is compressed so as to allow transmission/reception of the audio data within the band determined in Step S3.

Subsequently, the second communication control section 22 judges whether or not the bit pool value calculated in Step S7 is included in a numerical value range equal to or smaller than a predetermined maximum value and equal to or larger than a predetermined minimum value (S8), and if not included in the numerical value range, modifies the bit pool value to the predetermined maximum value or the predetermined minimum value (S9). The predetermined maximum value and the predetermined minimum value may be determined based on, for example, the numerical value range of the bit pool value that can be processed on a headset HS side. In addition, the bit pool value may be modified so as not to adopt the bit pool value within, for example, such a range that human-audible sound quality is hard to improve.

Finally, the second communication control section 22 outputs the bit pool value, which has been corrected in Step S7 and modified in Step S9 as necessary, to the predetermined storage area (S10). The data compression processing section 23 references the output bit pool value to perform the compression of the data to be transmitted to the headset HS according to the determined compressibility.

According to the communication device 1 according to the embodiment described above, by compressing the communication data to be transmitted by the second communication section 14 according to the compressibility determined based on the communication status of the first communication section 13, it is possible to continuously execute the Bluetooth communications by the second communication section 14 while performing adjustment so as not to excessively suppress the WLAN communications performed by the first communication section 13.

Note that the embodiment of the present invention is not limited to the above description. For example, in the above description, the first communication section 13 executes the WLAN communications, and the second communication section 14 executes the Bluetooth communications including the audio communications based on the A2DP, but the first communication section 13 and the second communication section 14 may also perform the adjustment of the compressibility as described above in a case of respectively performing communications that use a band causing a conflict between them based on communication standards other than those described above.

Further, in the above description, the first communication section 13 adjusts the compressibility based on whether or not the WLAN communications are being performed and what the communication data retransmission ratio of the communication data to be transmitted by the second communication section 14 is, but the adjustment of the compressibility may be executed based on other parameters indicating the communication status of each of the communication sections.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A communication device, comprising:
    a first communication section and a second communication section that use a band causing a conflict between the first communication section and the second communication section; and
    a compressibility adjusting section for changing a compressibility of communication data to be transmitted by the second communication section based on a communication status of the first communication section, the communication status of the second communication section, and a value of a retransmission ratio of the communication data to be transmitted by the second communication section,
    wherein the compressibility adjusting section calculates a value of the compressibility according to the value of the retransmission ratio so as to control an amount of data to be transmitted, including retransmission, per unit time within the band, and
    wherein processing to calculate the value of the compressibility and to adjust the compressibility to the calculated value is repeatedly executed every predetermined period of time while the second communication section transmits data according to a predetermined communication protocol.

2. A communication device according to claim 1, wherein the compressibility adjusting section changes the compressibility according to whether or not communications are being executed by the first communication section.

3. A communication device according to claim 1, wherein the compressibility adjusting section changes a compressibility of audio data to be transmitted by the second communication section.

4. A control method for a communication device comprising a first communication section and a second communication section that use a band causing a conflict between the first communication section and the second communication section, the control method comprising:
    changing a compressibility of communication data to be transmitted by the second communication section based on a communication status of the first communication section, the communication status of the second communication section, and a value of a retransmission ratio of the communication data to be transmitted by the second communication section,
    wherein the changing comprises calculating a value of the compressibility according to the value of the retransmission ratio so as to control an amount of data to be transmitted, including retransmission, per unit time within the band, and
    wherein processing to calculate the value of the compressibility and to adjust the compressibility to the calculated value is repeatedly executed every predetermined period of time while the second communication section transmits data according to a predetermined communication protocol.

5. A non-transitory computer-readable information storage medium, which stores thereon a program for causing a communication device, comprising a first communication section and a second communication section that use a band causing a conflict between the first communication section and the second communication section, to function as a compressibility adjusting section for changing a compressibility of communication data to be transmitted by the second communication section based on a communication status of the first communication section, the communication status of the second communication section, and a value of a retransmission ratio of the communication data to be transmitted by the second communication section,
    wherein the compressibility adjusting section calculates a value of the compressibility according to the value of the retransmission ratio so as to control an amount of data to be transmitted, including retransmission, per unit time within the band, and
    wherein processing to calculate the value of the compressibility and to adjust the compressibility to the calculated value is repeatedly executed every predetermined period of time while the second communication section transmits data according to a predetermined communication protocol.

* * * * *